(12) United States Patent
Driver et al.

(10) Patent No.: US 7,866,968 B2
(45) Date of Patent: Jan. 11, 2011

(54) REUSABLE INVERSION SLEEVE ASSEMBLY FOR INVERSION OF CURED IN PLACE LINERS

(75) Inventors: Franklin Thomas Driver, St. Charles, MO (US); Neil T. Birchler, St. Peters, MO (US); Kyle M. Costa, Wentzville, MO (US); Richard C. Polivka, Lemont, IL (US); Weiping Wang, Ballwin, MO (US)

(73) Assignee: INA Acquisition Corp., Wilmington, DE (US)

( * ) Notice: Subject to any disclaimer, the term of this patent is extended or adjusted under 35 U.S.C. 154(b) by 152 days.

(21) Appl. No.: 11/847,018

(22) Filed: Aug. 29, 2007

(65) Prior Publication Data

US 2008/0072982 A1    Mar. 27, 2008

Related U.S. Application Data

(60) Provisional application No. 60/840,818, filed on Aug. 29, 2006.

(51) Int. Cl.
   F16L 55/162    (2006.01)
   F16L 55/163    (2006.01)
   F16L 55/18     (2006.01)
   B29C 63/36     (2006.01)

(52) U.S. Cl. .................. 425/14; 425/59; 425/387.1; 264/36.16; 264/36.17

(58) Field of Classification Search .................. 425/11, 425/14, 59, 387.1; 264/36.16, 36.17; 138/97, 138/98

See application file for complete search history.

(56) References Cited

U.S. PATENT DOCUMENTS

| | | | | |
|---|---|---|---|---|
| 5,154,936 A | * | 10/1992 | Driver et al. | 425/182 |
| 5,597,353 A | * | 1/1997 | Alexander, Jr. | 425/387.1 |
| 6,960,313 B2 | * | 11/2005 | Waring et al. | 264/36.17 |
| 2006/0090804 A1 | | 5/2006 | Driver et al. | |
| 2008/0047624 A1 | * | 2/2008 | Iwasaki-Higbee | 138/98 |

FOREIGN PATENT DOCUMENTS

EP    1810814 A1    7/2007

* cited by examiner

Primary Examiner—Joseph S Del Sole
Assistant Examiner—Robert Dye
(74) Attorney, Agent, or Firm—Senniger Powers LLP (57) ABSTRACT

Installation of a flexible cured in place liner by inverting the liner utilizing an inversion sleeve assembly with an installation apparatus having at least one selectively operable rigid gland. The sleeve assembly includes a sleeve portion of an absorbable material secured in an apparatus with an inversion boot fitted at the distal end with an inlet port for inversion and/or curing fluid. The sleeve assembly and apparatus are particularly well suited for inverting with air and curing the liner with steam introduced through a perforated lay flat hose using an apparatus with two glands. The installation sleeve is the same dimension as the liner to be installed and is reusable thereby substantially reducing the set up time to install using the dual gland apparatus. Preferably, the flexible sleeve is a length of dry cured in place liner inverted on to itself to expose two impregnable surfaces. The sleeve may have a built in fluid inlet port for use with a dual gland apparatus.

16 Claims, 7 Drawing Sheets

REUSABLE INVERSION SLEEVE ASSEMBLY FOR INVERSION OF CURED IN PLACE LINERS

CROSS REFERENCE TO RELATED APPLICATION

This application is based on and claims the benefit of provisional application Ser. No. 60/840,818, filed Aug. 29, 2006, the contents of which is incorporated herein by reference in its entirety.

BACKGROUND OF THE INVENTION

This invention relates to a reusable inversion sleeve assembly for installing a cured in place liner with an apparatus having at least one rigid gland. The methods and apparatus reduce the time needed to set up a wet out cured in place liner for installations using air for inversion and steam for curing and use of a dual gland apparatus allowing use of a hold back strap and a lay flat hose for introduction of steam.

It is generally well known that conduits or pipelines, particularly underground pipes, such as sanitary sewer pipes, storm sewer pipes, water lines and gas lines that are employed for conducting fluids frequently require repair due to fluid leakage or deterioration. The leakage may be inward from the environment into the interior or conducting portion of the pipelines. Alternatively, the leakage may be outward from the conducting portion of the pipeline into the surrounding environment. In either case, it is desirable to avoid this leakage.

The leakage may be due to improper installation of the original pipe, or deterioration of the pipe itself due to normal aging or to the effects of conveying corrosive or abrasive material. Cracks at or near pipe joints may be due to environmental conditions such as earthquakes or the movement of large vehicles on the overhead surface or similar natural or man made vibrations, or other such causes. Regardless of the cause, such leakage is undesirable and may result in waste of the fluid being conveyed within the pipeline, or result in damage to the surrounding environment and possible creation of a dangerous public health hazard. If the leakage continues it can lead to structural failure of the existing conduit due to loss of soil and side support of the conduit.

Because of ever increasing labor, energy and machinery costs, it is increasingly more difficult and less economical to repair underground pipes or portions that may be leaking by digging up and replacing the pipes. As a result, various methods had been devised for the in place repair or rehabilitation of existing pipelines. These new methods avoid the expense and hazard associated with digging up and replacing the pipes or pipe sections, as well as the significant inconvenience to the public. One of the most successful pipeline repair or trenchless rehabilitation processes that is currently in wide use is called the Insituform® Process. This Process is described in U.S. Pat. Nos. 4,009,063, 4,064,211 and 4,135,958, all the contents of which are incorporated herein by reference.

In the standard practice of the Insituform Process an elongated flexible tubular liner of a felt fabric, foam or similar resin impregnable material with an outer impermeable coating that has been impregnated with a thermosetting curable resin is installed within the existing pipeline. Generally, the liner is installed utilizing an eversion process, as described in the later two identified Insituform patents. In the eversion process, radial pressure applied to the interior of an everted liner presses it against and into engagement with the inner surface of the pipeline. However, the Insituform Process is also practiced by pulling a resin impregnated liner into the conduit by a rope or cable and using a separate fluid impermeable inflation bladder or liner that is everted within the liner to cause the liner to cure against the inner wall of the existing pipeline. Such resin impregnated liners are generally referred to as "cured-in-place-pipes" or "CIPP liners" and the installation is referred to a CIPP installation.

The CIPP flexible tubular liners have an outer smooth layer of relatively flexible, substantially impermeable polymer coating the outside of the liner in its initial state. When everted, this impermeable layer ends up on the inside of the liner after the liner is everted during installation. As the flexible liner is installed in place within the pipeline, the pipeline is pressurized from within, preferably utilizing an eversion fluid, such as water or air to force the liner radially outwardly to engage and conform to the interior surface of the existing pipeline.

Typically, an eversion tower is erected at the installation site to provide the needed pressure head to evert the liner or a bladder. Alternately, an eversion unit as shown and described in U.S. Pat. Nos. 5,154,936, 5,167,901 (RE 35,944) and 5,597,353, the contents of which are incorporated herein by reference. Cure may be initiated by introduction of hot water into the everted liner through a recirculation hose attached to the end of the everting liner. Inversion water is recirculated through a heat source such as a boiler or heat exchanger and returned to the inverted liner until cure of the liner is complete. The resin impregnated into the impregnable material is then cured to form a hard, tight fitting rigid pipe lining within the existing pipeline. The new liner effectively seals any cracks and repairs any pipe section or pipe joint deterioration in order to prevent further leakage either into or out of the existing pipeline. The cured resin also serves to strengthen the existing pipeline wall so as to provide added structural support for the surrounding environment.

The eversion tower, which was time consuming to construct, caused workers to be 30 feet above the ground often near trees and electrical wires. This method was improved by an apparatus, which allowed Insituform to create a hydraulic head by the use of a sphincter valve. The liner was fed into the top of the apparatus and pulled through the sphincter valve by pressurized water below the valve. The pressurized water applied a force on the nose of the liner causing it to invert into the pipe being rehabilitated. These apparatuses for the rehabilitation of small diameter pipe have been in use for about fifteen years.

The major disadvantage to the use of these apparatuses with water is the quantity and availability of the inverting water. Water must be heated typically from 55° F. to 180° F. in order to affect the cure, and then cooled by the addition of more water to 100° F. before being released to an acceptable disposal system.

This disadvantage may be overcome by using air in lieu of water to create the inverting force. Once the impregnated liner is fully inverted, it then can be cured with steam. Although water is necessary to produce steam, the quantity of water in the form of steam is only 5-10% of that required for water inversion, cure and cool down. This means that steam can be used for curing even if water is not readily available on site. This drastic reduction in the quantity of water is the result of the higher energy available from one pound of water in the form of steam versus one pound of heated water. One pound of steam condensing to one pound of water gives off approximately 1000 BTUs while one pound of water gives off only one BTU for each degree in temperature drop. This reduced water requirement plus virtual elimination of the heat up cycle greatly reduces cure cycle and installation time.

With this apparent advantage in using air inversion and steam cure why has the industry been slow to abandon water inversion and hot water cure?

When water is used to invert the resin-impregnated liner, the uninverted portion of the liner from the inverting nose to the inverting apparatus is buoyed up by a force equal to the quantity of water displaced by the liner. In the case of CIPP liners, this mean the effective weight of the liner is substantially reduced, as is the force necessary to pull the uninverted liner forward to the inverting nose. When air is used to create the inverting force, the uninverted liner lies on the bottom of the pipe and the air pressure acting on the inverting nose of the liner must pull the full weight of the liner forward.

Three forces must be over come to invert a CIPP liner no matter what is used to create the inverting energy. These forces are:

1. Force required to invert the liner (turn liner inside out). This force varies by liner thickness, material type and relation of liner thickness to diameter.
2. The force necessary to pull the liner from the inverting apparatus to the inversion nose.
3. The force necessary to pull the liner through the inverting apparatus.

Force number one (1) above is generally the same for both air and water inversions.

Force number two (2) varies greatly between air and water and can limit the length of air inversions. There is limit on how much pressure can be used to invert a liner without adversely affecting the quality of the installed CIPP liner and/or damaging to the existing conduit. Lubricant can be used for both water and air inversion to reduce the required pulling force.

Force number three (3) can vary based on the apparatus design. In most apparatus presently in use, the force required to pull the liner through the apparatus will increase when either or both forces one and two increase. This is caused by the fact that in order to increase available inversion energy, typical apparatus in use today restrict loss of pressurized fluid from the pressure chamber below the liner entry point into the apparatus and the cuff and banded end of the liner being inverted. This restriction is typically accomplished by increasing the air pressure in a pneumatic sphincter gland, or by using a gland that is energized by the inverting fluid. The movement inward in typical cases is restricted by the gland material and compression of the inverting CIPP liner. This in turn causes an increase on the friction between the inverting CIPP liner and gland.

In view of these apparent benefits of steam cure compared to hot water cure, the use of steam has been proposed in view of the energy it carries. Air invert an inflation bladder and flow-through steam to cure has been disclosed in Insituform U.S. Pat. Nos. 6,708,728 and 6,679,293, the contents of which are incorporated herein by reference. The processes disclosed in these recently issued patents utilize pull in and inflate technology and are currently in use for small diameter liners. They provide advantages over water eversion for small diameters. However, the process described does not provide for use of a lay flat hose for introduction of steam. Moreover, use of a puncturing canister disclosed in these patents is not suitable for medium and large diameter liners. Generally, medium size liners are considered to be those between about 18 and 36 inches in diameter. Large diameters are those in excess of about 42 inches and larger in diameter.

Accordingly, it is desirable to provide improvements to reduce the efforts needed to prepare a CIPP liner for installation using an apparatus having at least one selectively operable rigid gland for introduction of air for inversion without having to deflate the liner prior to injecting steam for curing.

SUMMARY OF THE INVENTION

Generally speaking, in accordance with the invention, an inversion sleeve assembly for installation of a cured in place liner with a rigid gland apparatus is provided. The inversion sleeve assembly includes a tubular flexible sleeve and a cylindrical banding boot having an inlet port for introducing inversion and/or curing fluid at the distal end of the sleeve. The sleeve and the inversion boot are of the same dimension as the cured in place pipe liner to be inverted. The assembly is used with an installation apparatus having a frame with at least one selectively operable rigid gland upstream of the banding boot. The sleeve passes between a rigid gland used to form a fluid seal. The flexible inversion sleeve may have an installed curing fluid inlet for use with an apparatus having two rigid glands. In this case, the inlet on the sleeve is located between the two glands with the banding boot downstream of the lower gland. In a preferred embodiment the flexible sleeve is a length of dry cured in place liners of the same dimension as the liner being installed. The sleeve has at least one layer of impregnated material and an outer impermeable layer. The impregnable material holds lubricant to aid in the installation and the sleeve assembly is reusable.

A resin impregnated liner is fed through the flexible inversion sleeve and banding boot, turned back and banded about the banding boot prior to being inverted into the existing conduit. Selective opening and closing of the glands in a dual gland apparatus allows passage of a hold-back cable or strap to control the speed during the second half of the inversion and passage of a lay flat hose and steam fitting for introduction of heated air or steam during cure. Use of a perforated lay flat hose for steam cure allows for introduction of steam along the entire length of the inverted liner to avoid the consequences of accumulation of condensate that often leads to poorly cured sections of liner in steam cure processes. The dual glands allow for the lay flat hose with steam attachment to pass through the frame and into the inverted liner without deflating the liner prior to introduction of curing fluid. Preferably, the lay flat hose has alternating holes formed along its length near the edge. Typically, this is ¼ to 1½ inches from the edge of the lay flat hose. This is to insure distribution of steam at the bottom along the full length of the liner regardless of the orientation of the hose. Once the inversion is stopped, a porting drill or forming device may be used to form an exhaust port with an adjustable exhaust hose. Steam is introduced into the liner through the lay flat hose to cure the resin without allowing the inverted liner to deflate.

Accordingly it is an object of the invention to provide an improved reueable sleeve assembly for use with a rigid gland apparatus for installing a CIPP liner.

It is another object of the invention to provide an inversion sleeve with installed fluid(s) inlet for use with a rigid gland apparatus for inverting a CIPP liner with air and curing with steam.

It is another object of the invention to provide an improved method for air inversion and steam cure of a CIPP liner with an apparatus having rigid dual glands.

It is a further object of the invention to provide an improved method wherein a cured in place pipe liner is inverted with air and cured with steam without deflating the liner after being positioned within the existing conduit.

Yet another object of the invention is to provide a method and apparatus suitable for air inversion and steam cure wherein the liner is inverted through a segment of liner formed with at least one port for introduction of air and/or steam.

Still another object of the invention to provide an improved method of air inversion of a CIPP liner with a holdback strap and lay flat hose for introduction of steam to cure the liner.

Still other objects and advantages of the invention will in part be obvious and will in part be apparent from the specification.

The invention accordingly comprises the several steps and the relation of one or more of such steps with respect to the others, and the apparatuses possessing the features, properties and relation of elements which are exemplified in the detailed disclosure and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

An improved method and apparatus for air inverting and steam curing a CIPP liner in compliance with ASTM F1216 Standard Practice for Rehabilitation of Existing Pipelines and Conduits by the Inversion and Curing of a Resin-Impregnated Tube is described. The method and apparatus described herein are well suited for the installation of medium diameter CIPP liners working from the surface through structures, such as manholes to rehabilitate existing buried pipelines and conduits.

Figure 1:
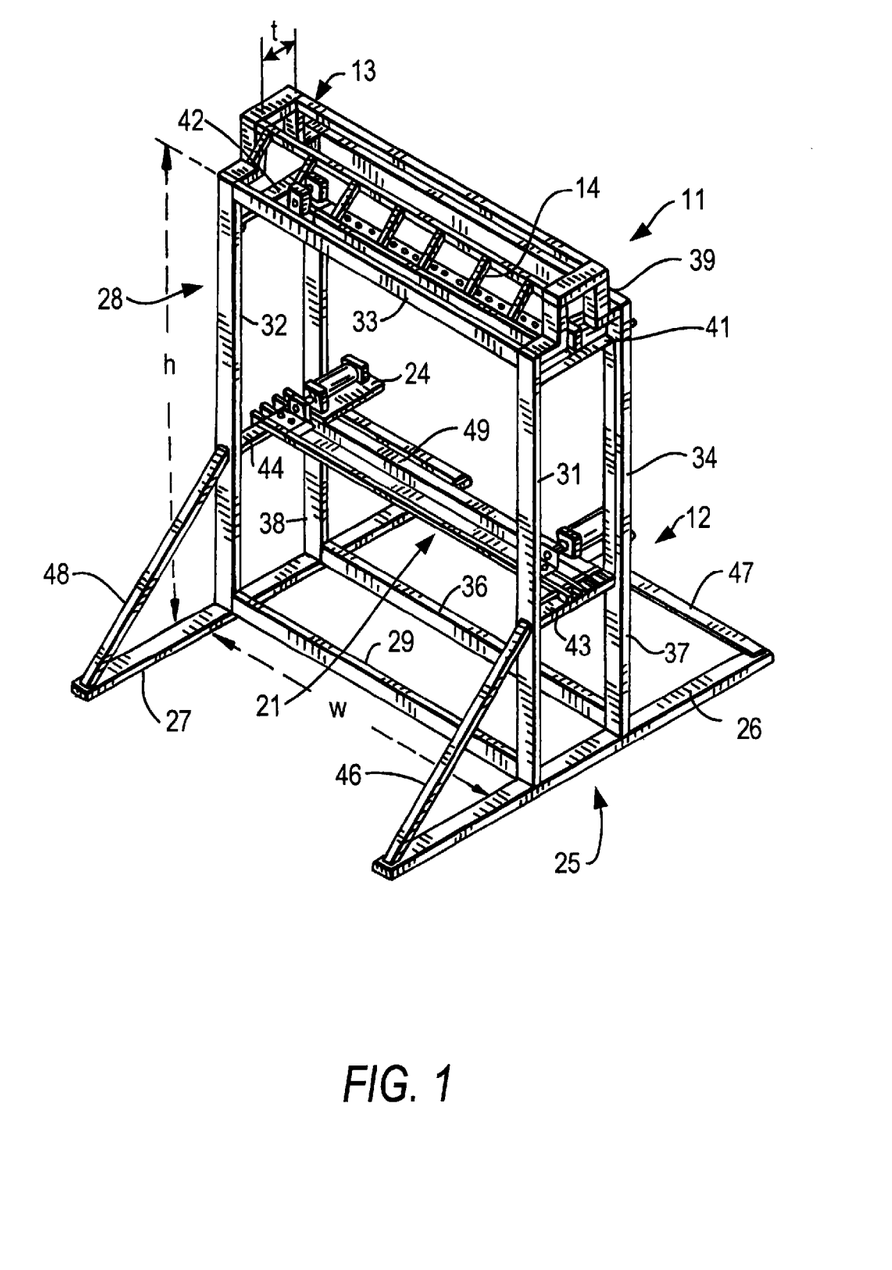
FIG. 1 is a schematic perspective view of an apparatus with a rigid glands for air inversion and steam cure of a cured in place pipe liner constructed and arranged in accordance with the invention.
Figure 1A:
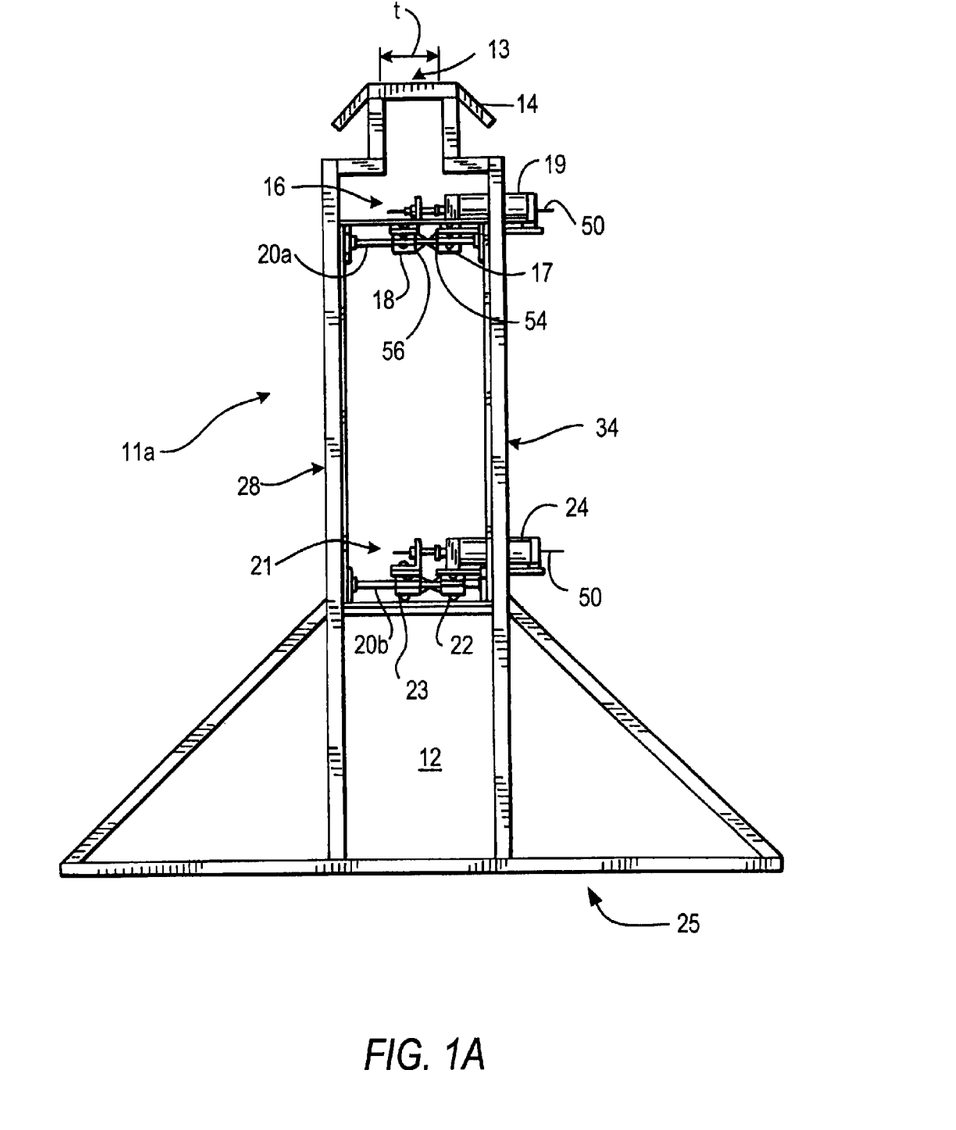
FIG. 1A is a schematic elevational view of an apparatus with dual rigid glands for air inversion and steam cure of a cured in place pipe liner constructed and arranged for use in accordance with the invention.

An inverting apparatus 11 having a single rigid lower gland 21 constructed and arranged in accordance with the invention is shown in FIG. 1. In FIG. 1A, a similar apparatus 11a having an upper gland 16 and lowe gland 21 is shown. In view of the similarity of elements, the same reference numeral are used in FIGS. 1 and 1A to describe identical elements.

Figure 2:
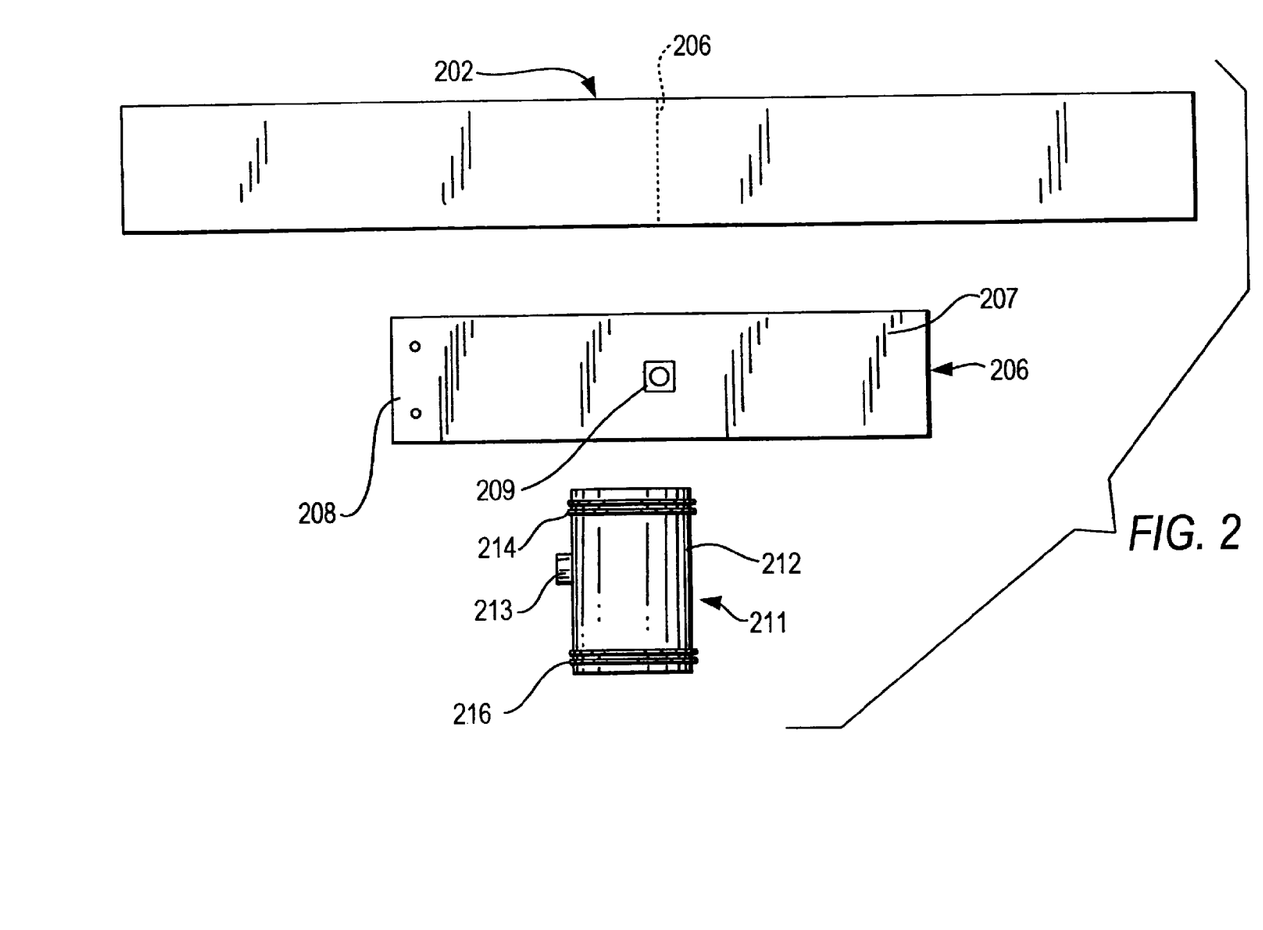
FIG. 2 is a schematic view of the elements of an inversion sleeve assembly constructed and arranged in accordance for use with the invention suitable for use with an apparatus of the type shown in FIGS. 1 and 1A.

Apparatuses 11 and 11a are rigid frames dimensioned to be positioned over the inverting access to the conduit to be lined. Apparatuses 11 and 111 are fabricated from metal bars or tubes to form a frame 12 having a sufficient width "w" to receive a flattened cured in place pipe liner to be installed. Frame 12 is substantially rectangular in the illustrated embodiment and has a rectangular entry opening 13 with a plurality of hooks 14 to secure a flexible inversion sleeve 207 as shown in FIG. 2. Opening 13 has a thickness "t" selected to allow the inversion sleeve assembly to be secured on hooks 14 and pass through entry opening 13.

Frame 12 has a height "h" sufficient to support sleeve 207 and a banding boot 211 secures to the bottom of sleeve 207. In the dual gland unit of FIG. 1A, a first or upstream gland 16 formed of a fixed gland member 17 and an opposed cooperating displaceable gland member 18 is positioned adjacent to entry 13. A pair of air cylinders 19 are attached to the ends of frame 12 and connected to displaceable member 18 for displacing member 18 towards fixed member 17. Cylinders are pneumatic air cylinders with linear guide bearings. Cylinders 19 may be any mechanical closing mechanism or motor of any type, such as hydraulic or electrical, or a mechanical clamping mechanism.

In FIG. 1A, a second or downstream gland 21 formed in the same manner as upper gland 16 has a rigid gland member 22 fixed to frame 12 and a moveable gland member 23 on a pair of linear guide bearings 20b with an attached air cylinder 24. Height "h" of frame 12 is selected to provide sufficient room between upper gland 16 and lower gland 21 to utilize a fluid inlet port installed in flexible sleeve 207 for introduction of air and/or steam into a liner 200. An inverting fluid inlet port is installed in the inversion boot of the inverted liner and positioned downstream of lower gland 21 and before the manhole access. A complete description of the liner and installation ports will be set forth in more detail below.

In the illustrated embodiment of FIG. 1, only lower glad 21 is mounted on frame 12. In both FIGS. 1 and 1A, frame 12 has a base 25 formed of two side tubes 26 and 27 welded to a rectangular front frame 28 formed of a bottom tube 29, two vertical side tubes 31 and 32 and a top tube 33. Vertical tubes 31 and 32 are welded to base side tubes 26 and 27, respectively. A matching rectangular back frame 34 formed of a bottom tube 36, two side tubes 37 and 38 and a top tube 39 is welded to base side beams 26 and 27 in the same manner as front frame 28. A pair of upper horizontal gland support tubes 41 and 42 is secured between front side tubes 31 and 32 of front frame 28 and side tubes 37 and 38 of back frame 34. Similarly, a pair of support beams 43 and 44 is secured between front frame 28 and back frame 34 to support lower gland 21. Four angled support tubes 46, 47, 48 and 49 are welded between the front and back of side tubes 26 and 27 to provide stability to frame 12. While angled support tubes are shown, it is contemplated that rectangular support members forming a step may be used to provide a working platform at or about the height of lower gland 21.

Air cylinders 24 and shown mounted above lower gland 21. Each cylinder is connected to a coupling so that runs on a pair of linear guide bearings.

In FIG. 1A fixed gland member 17 and displaceable gland member 18 of upper gland 16 has a compressible high temperature resistant blanket 54 and 56 mounted on the opposed mating faces. This compressible material 54 and 56 will conform to and tightly engage an inverting liner with a holdback strap and lay flat hose as they pass through upper gland 16 during the second half of the inversion. In addition, compressible material 54 and 56 will form a suitable conforming seal when upper gland 16 is closed during steam cure.

The rigid cooperating opposed faces of members 22 and 23 of lower gland 21 may be flat. Curvature may be added to the mating surfaces by welding a small diameter pipe to beams 22 and 23 or by using tubes or pipes for member 22 and 23. This curved surface provides a smoother surface for engaging the inverted liner.

Lower gland 21 forms the air seal during air inversion in both apparatus 11 and 11a. During the start and first half of the inversion, lower gland 21 is closed to a distance apart of about four times the thickness of the liner by use of a gap setting device. This device may be appropriately sized spacers placed on guide hearings 20a and 20b. Once the holdback strap and lay flat hose pass through lower gland during the second half of the inversion, the gap of lower gland 21 is reduced to about twice the liner wall thickness.

By utilizing this construction, an increase in inverting air pressure will cause the liner to invert without requiring an increase in pressure on the liner at lower gland 21 by members 22 and 23. Air pressure to cylinders 24 may be increased to prevent gland 21 from opening to a gap more than twice the liner thickness. The gap adjustment device, such as spacers placed on guide bearings or threaded bolts prevent a reduction of the gap beyond that desired.

FIG. 2 illustrates a section of a cured in place liner suitable for forming flexible sleeve 207 inverted to a fold line 206. A port 209 is formed through both layers of flexible material. End 208 is folded over to form hanging sleeve 207 on apparatus 11 or 11a. A banding boot 211 having a properly dimensioned cylindrical wall 212 with a pair of banding ribs 214 and 216 and a fluid inlet port is also shown.

Figures 3, 3A, 3B:
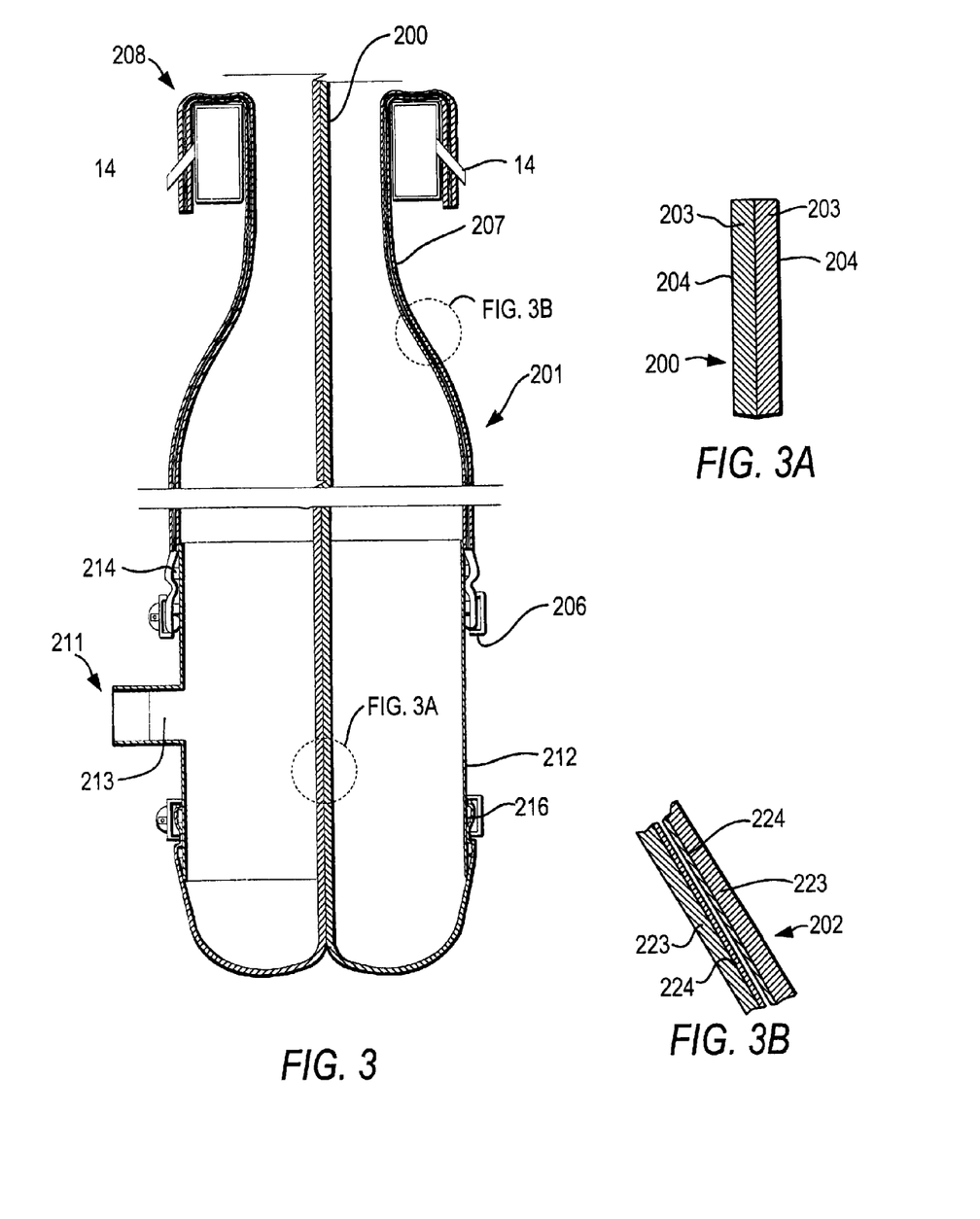
FIGS. 3, 3A and 3B are cross-sectional views of the inversion sleeve assembly constructed in accordance with the invention.

FIGS. 3, 3A and 3B illustrate the elements of an inversion tube assembly 201 constructed and arranged in accordance with the invention. In this embodiment, assembly 201 includes a sleeve portion 207 formed from a dry section of a cured in place liner 202 having a resin impregnable layer 223 with an impermeable coating 224 of approximately twice the desired length. Liner 202 is inverted on itself along a fold line 206. This positions impermeable layers 224 facing each other with resin impregnable material 223 on the outer surfaces of an inverted sleeve 207 as shown in FIG. 3 detail B. A short segment of sleeve 207 is folded back at the edges to form a hanging section 208 as shown in FIG. 3.

A fluid inlet port 209 for introduction of air and/or steam is formed at an appropriate location along the length of the sleeve 207. Port 209 provides access to the interior of sleeve 207 wherein resin impregnable layers 223 face each other. A banding boot 211 formed of a substantially rigid cylindrical wall 212 is formed with a fluid inlet port 213. Ribs 214 and 216 are formed at each end of cylindrical sidewall 212. This allows banding folded end 206 of sleeve 207 to ribs 214 to complete construction of an inversion sleeve 201 assembly as illustrated in FIG. 2. Upon inserting a cured in place liner through sleeve 207 and boot 211, the end of a liner 200 to be inverted is banded to ribs 216.

FIG. 3 illustrates in cross-section the various layers of a liner 200 and an inversion sleeve secured to hooks 14. As shown, hanging section 208 of sleeve 207 is secured on hooks 14 with a layer of resin impregnable material 223 on the outside of hooks 14 with an impermeable layer 224 facing an impermeable layer 224 on the inside. Banding boot 211 is attached to folded end 206 of sleeve 207 and secured at ribs 214. Sleeve section of liner 207 is selected to be the same dimension as liner 200 to be installed. This provides the efficient sealing when a rigid gland is closed.

By utilizing a double thickness of a section of cured in place pipe liner 202 as inversion sleeve 207, this provides increased dimensional stability. In additional to utilizing a standard coated resin impregnable section of liner, reinforcement in the weft and/or warp direction of an impregnable material may be included. Alternatively, helical reinforcement elements may be utilized or a reinforced coating such as a reinforced coated scrim providing increased strength in both the warp and weft direction may be used to provide additional dimensional stability to sleeve 202 during the inversion and cure.

Folded edge 208 is retained so as to provide additional stability after banding at ribs 214. By utilizing this construction, lubricant can be added to interior impregnable layer 223 of inversion sleeve 207. This allows inversion sleeve 207 to be utilized for several installation.

The seal around liner 200 to be installed is created by sleeve 207 of the identical profile and dimension. Thus, it is not necessary to be concerned about forming a seal at the edges of the flattened liner. The length of the edge perimeter of the flattened liner is minimal compared to the long sides of the flattened liner so that stress on the edges are minimal and no addition closure or support at the edges is needed. This allows use of straight rigid tubes or beams to form the gland and seal. The process and apparatus disclosed provide an advantage over prior art inversion devices. In these latter devices forming a seal at the edges is difficult because the inversion commences downstream of the seal or gland. Here, there is an advantage due to the fact that the inversion of the liner has commenced before the liner passes through a gland for forming an inversion and curing seal.

Figure 4:
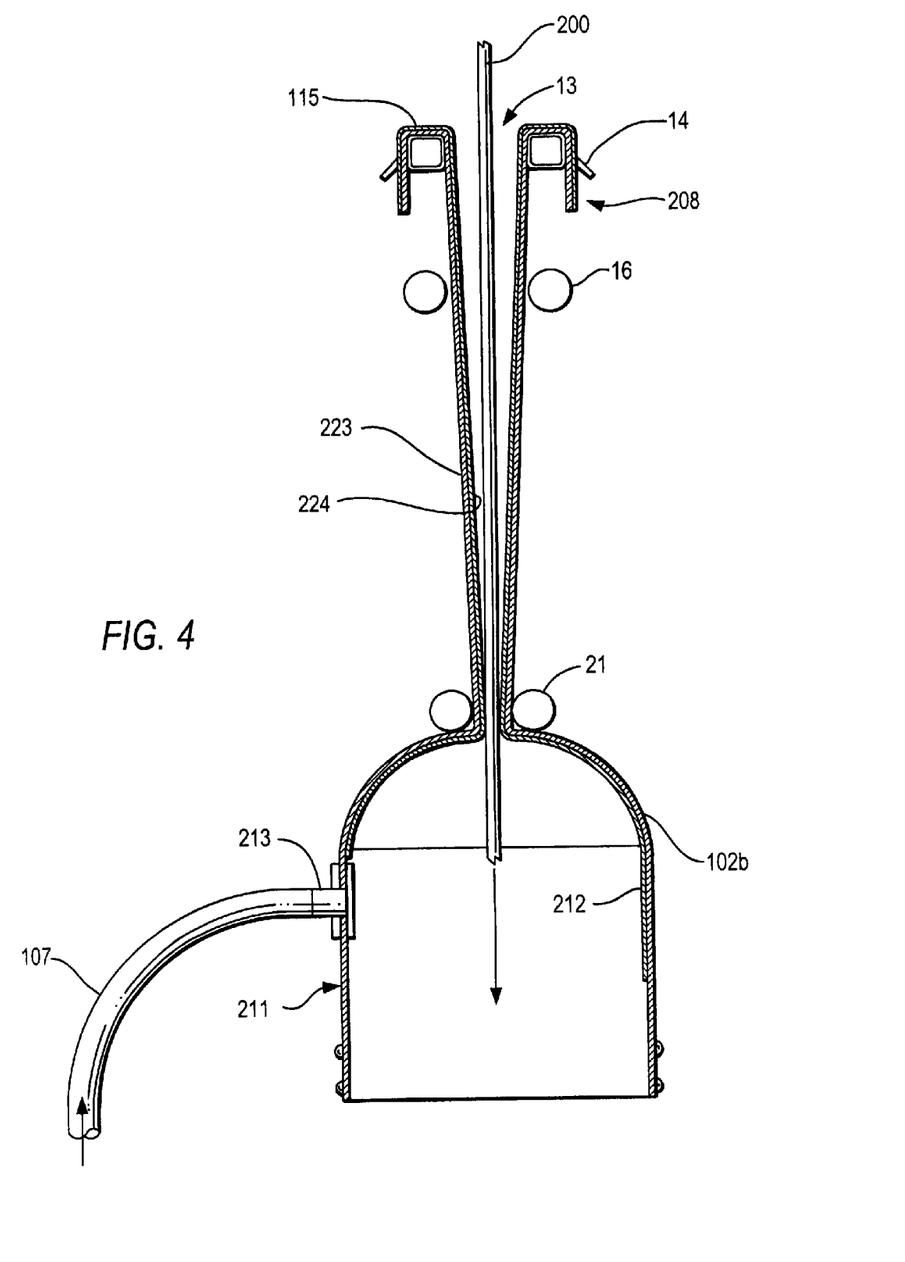
FIG. 4 is a schematic view in cross-section showing the inversion sleeve assembly and position of the gland of a single gland apparatus of FIG. 1 during inversion.

The first half of an inversion with apparatus 11a is shown in schematic in FIG. 4. The same would be true for apparatus 11 of FIG. 1 if a lay flat hose was not to be used in the installation. Gland 21 is closed to a fixed gap to accommodate the thickness of sleeve 207 and flattened liner 200 using gap setting devices. Inversion air is fed into inlet port 213 from an air inlet hose 107 to cause liner 200 to invert into the conduit being lined.

Figure 5:
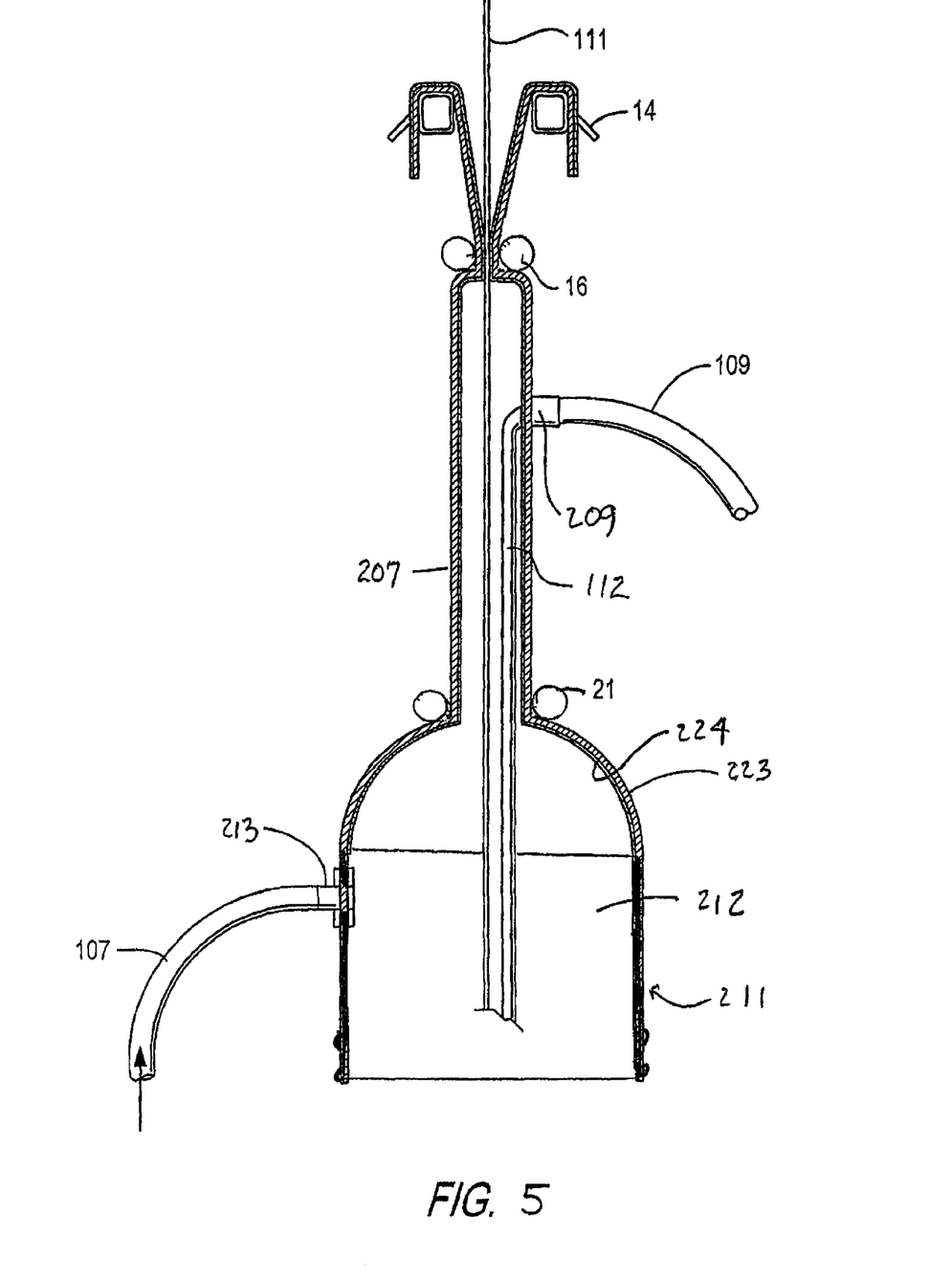
FIG. 5 is a schematic view in cross-section showing an inversion sleeve assembled with a fluid inlet in the flexible tubular section and showing the position of the glands of a dual gland apparatus of FIG. 2 with air/steam supply hose attached in preparation for introduction of steam for curing.
Figure 6A:
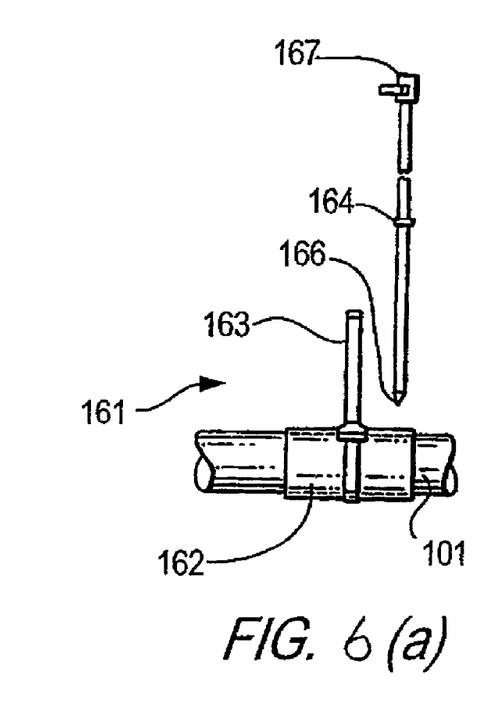
FIGS. 6(a) and 6(b) illustrate an exhaust porting technique.
Figure 6B:
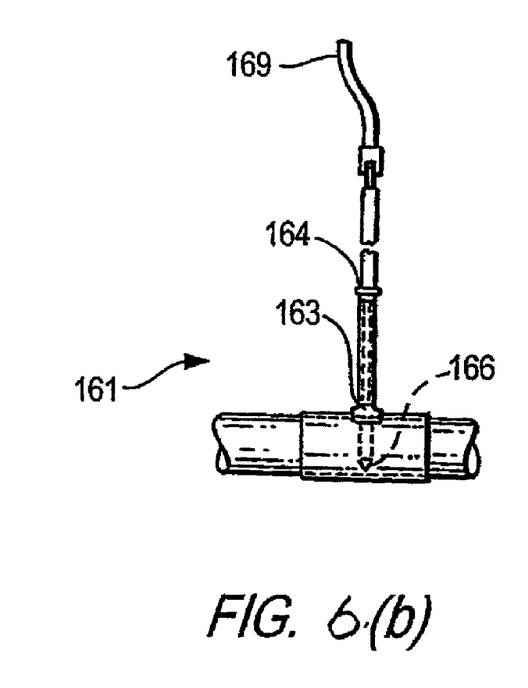

FIG. 5 illustrates installation using apparatus 11a of FIG. 1A with dual rigid glands 16 and 21. At the halfway point of the inversion upper gland 16 is closed to engage a holdback strap 111 and a lay flat hose 112. Lay flat hose 112 has a closed end 112a. Then, during the second half of the inversion, lower gland 21 is opened and inversion air is fed into air inversion inlet port 213 to complete the inversion. At this time lower gland 21 is closed and upper gland 16 is opened.

When upper gland 16 is open, lay flat hose 112 is cut above upper gland 16 and a steam hose is attached to the cut end through port 209 with a flexible layflat adapter attached to layflat hose 112 and inserted into air/steam port 209 to facilitate the addition of steam to inverted liner 200. The layflat adapter may be a thin tubular rigid bendable metal sleeve with a flared profile which prevents it from being pulled into the air/steam port. The tubular portion of the sleeve is inserted into the cut end of the lay flat and inserted into the inlet port. The lay flat hose is then engaged between the flared region of the sleeve and the port. The slack in lay flat hose 112 will drop into the invert when upper gland 16 is closed and lower gland 21 opened at the start of the steam cycle as shown in FIG. 5.

Referring now to FIG. 5, steam is introduced into attached perforated lay flat hose 112 to initiate cure of the resin in inverted liner 200 with gland 16 closed and gland 21 open. In an exemplary embodiment of the invention, lay flat hose 112 is a high temperature thermoplastic tube about 4 inches in diameter with one-eighth to one-quarter inch orifices depending on the size of the CIPP liner. The size and spacing may vary depending on the boiler and liner size and length. The orifices are created at one foot intervals at almost one-half inch from the folded edges at alternating edges. The distance from the edges may vary depending on size and length. This pattern is selected to insure that steam will be injected into any ponded condensate in the conduit invert. This heats the condensate to temperature that will affect cure of the CIPP liner section directly under the ponded condensate.

The orifice pattern described provides more steam at the proximal end of liner 200 and ensures good mixing even if hose 112 becomes twisted. This also insures that steam is injected into any condensate that forms in the pipe invert to cure that portion of the resin in the liner covered by the condensate pool. Steam is provided from a steam inlet hose 109 that is regulated by a valve manifold. The steam flow is adjusted to maintain a curing pressure of about 3-6 psi until cure cycle is complete.

Knowing the physical properties of the CIPP liner (diameter, length, thickness, resin and catalyst system) and available boiler output in BTUs per hour permits the adjustment of orifice size to match boiler output in pounds of steam per hour with recommended cure cycle time.

It can readily be seen that the process in accordance with the invention readily allows one to attain the advantage of curing a resin liner with flow through steam. By practicing the process, a tubular member can be easily inverted through an existing pipeline. Providing an apparatus having two rigid glands allows an inverting liner to be installed with a hold back strap and lay flat hose. Use of gap setting devices to maintain the gap at the lower gland allows for increasing eversion pressure to be applied to the complete profile of the liner without increasing the gland pressure on the inverting liner. Steam is then passed into the inverted liner to utilize the higher energy available in the steam that significantly shortens the cure cycle when compared to hot water cure.

It will thus be seen that the objects set fort above, among those made apparent from the preceding description, are efficiently attained and, since certain changes may be made and carrying out the above method and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall there between.

What is claimed is:

1. An inversion sleeve assembly for installation of a cured in place pipe liner, the assembly comprising:
    a flexible tubular sleeve comprising a sidewall extending between an open proximal end and an open distal end, the flexible tubular sleeve having an opening in the sidewall between the proximal and distal ends and a port received in the opening, the port being adapted to connect a conduit extending externally of the sidewall to a hose extending internally of the sidewall for supplying a heated fluid from the conduit to the hose through the opening in the sidewall; and
    a banding boot having a substantially rigid peripheral sidewall and a fluid inlet port extending through the sidewall of the banding boot,
    wherein the distal end of the flexible sleeve is secured to the banding boot.

2. The inversion sleeve assembly of claim 1, wherein the sidewall of the sleeve has layers including an inner flexible tubular layer comprising an absorbent material and a layer comprising an impermeable material.

3. The inversion sleeve assembly of claim 2, wherein the sidewall of the flexible sleeve includes more than one layer of absorbent material.

4. The inversion sleeve assembly of claim 2, wherein the sidewall of the flexible sleeve includes reinforcement to increase the dimensional stability thereof.

5. The inversion sleeve assembly of claim 4, wherein the reinforcement is in the layer comprising the absorbent material.

6. The inversion sleeve assembly of claim 4, wherein the reinforcement is in the layer comprising the impermeable material.

7. The inversion sleeve assembly of claim 1 in combination with a lay flat hose connected with the opening in the sidewall of the sleeve, wherein the lay flat hose extends through the banding boot.

8. The inversion sleeve assembly of claim 1, wherein the flexible sleeve comprises a segment of a tubular material that is inverted on itself at a fold line at the distal end of the sleeve.

9. The inversion sleeve assembly of claim 8, wherein the segment of tubular liner material comprises a layer comprising an absorbent material and a layer comprising an impermeable layer, the layers being positioned so the layer comprising the absorbent material forms an inner surface of the sidewall and an outer surface of the sidewall.

10. The inversion sleeve assembly of claim 1, wherein the banding boot is substantially cylindrical.

11. The inversion sleeve assembly of claim 1 wherein the flexible sleeve has a diameter that is substantially the same as a diameter of the cured in place pipe liner.

12. An inversion sleeve assembly for installation of a cured in place pipe liner, the assembly comprising:
    a flexible tubular sleeve comprising a sidewall extending between an open proximal end and an open distal end, the flexible tubular sleeve having an opening in the sidewall between the proximal and distal ends;
    a banding boot having a substantially rigid peripheral sidewall and a fluid inlet port extending through the sidewall of the banding boot, the distal end of the flexible sleeve being secured to the banding boot, and
    an inverting apparatus,
    wherein the inverting apparatus comprises first and second glands, the first and second glands each being positioned axially along the sleeve between the proximal and distal ends thereof, the opening in the sidewall of the sleeve being positioned axially along the sleeve between the first and second glands, wherein each of the first and second glands is moveable relative to the sleeve between an open position in which opposing inner surfaces of the sleeves are free to move apart from one another for allowing materials to pass relatively unimpeded through the sleeve at the respective gland and a closed position in which the gland holds the inner surfaces of the sleeve relatively closer to one another to limit flow of fluid through the sleeve at the respective gland.

13. The inversion sleeve assembly and inverting apparatus of claim 12, further comprising a lay flat hose extending through the banding boot.

14. The inversion sleeve assembly and inverting apparatus of claim 13, wherein the lay flat hose extends through the proximal end of the sleeve, the sleeve being adapted to be squeezed against the lay flat hose by one of the glands to form a seal.

15. The inversion sleeve assembly and inverting apparatus of claim 13, wherein the lay flat hose is connected to the opening in the sidewall of the sleeve, the flexible sleeve being adapted to be squeezed by one of the glands proximally of the lay flat hose to form a seal.

16. An inversion sleeve assembly for installation of a cured in place pipe liner, the assembly comprising:

a flexible tubular sleeve comprising a sidewall extending between an open proximal end and an open distal end, the flexible tubular sleeve having an opening in the sidewall between the proximal and distal ends;

a banding boot having a substantially rigid peripheral sidewall and a fluid inlet port extending through the sidewall of the banding boot, the distal end of the flexible sleeve being secured to the banding boot; and a lay flat hose connected with the opening in the sidewall of the sleeve, wherein the lay flat hose extends through the banding boot.

* * * * *

UNITED STATES PATENT AND TRADEMARK OFFICE
CERTIFICATE OF CORRECTION

| | | |
|---|---|---|
| PATENT NO. | : 7,866,968 B2 | Page 1 of 1 |
| APPLICATION NO. | : 11/847018 | |
| DATED | : January 11, 2011 | |
| INVENTOR(S) | : Driver et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 269 days.

Signed and Sealed this
Twenty-eighth Day of June, 2011

David J. Kappos
*Director of the United States Patent and Trademark Office*